United States Patent [19]

Stammen

[11] Patent Number: 4,856,599

[45] Date of Patent: Aug. 15, 1989

[54] GROUND-WORKING TOOL FOR ATTACHMENT TO THE FOOT OF A WEARER

[76] Inventor: Joseph L. Stammen, Rte. 10, Box 389, Crossville, Tenn. 38555

[21] Appl. No.: 216,639

[22] Filed: Aug. 23, 1988

[51] Int. Cl.⁴ .......................... A43C 17/02; A01B 1/06
[52] U.S. Cl. .................................... 172/370; 30/297; 36/113; 172/376
[58] Field of Search ................ 172/370, 376; 30/297; 36/113

[56] References Cited

U.S. PATENT DOCUMENTS

| | | |
|---|---|---|
| 163,372 | 5/1875 | Gorham . |
| D. 242,517 | 11/1976 | Garrison . |
| 391,738 | 10/1888 | Cross ..................................... 36/113 |
| 419,624 | 1/1890 | Ballentine ....................... 172/370 X |
| 806,622 | 12/1905 | Baker et al. . |
| 1,138,076 | 5/1915 | Brigance . |
| 1,594,984 | 8/1926 | Stafford ............................... 172/376 |
| 2,446,512 | 8/1948 | Miller ................................... 172/376 |
| 2,714,768 | 8/1955 | Badler ...................................... 36/1 |
| 2,779,262 | 1/1957 | Furr et al. . |
| 2,802,264 | 8/1957 | Smith .................................... 30/297 |
| 4,693,022 | 9/1987 | Terhune ................................ 30/297 |

FOREIGN PATENT DOCUMENTS 692503  6/1940 Fed. Rep. of Germany .
876928  5/1953 Fed. Rep. of Germany ...... 172/370
135284  11/1919 United Kingdom .

Primary Examiner—Richard J. Johnson
Attorney, Agent, or Firm—Luedeka, Hodges & Neely

[57] ABSTRACT

A ground-working tool for attachment to the foot of the wearer includes a base plate for attachment against the underside of a wearer's shoe and a pair of ground-working hoe blades rigidly supported beneath the base plate. The hoe blades are generally flat in shape and are arranged in a common plane with one of the hoe blades being positioned beneath a forward portion of a base plate and the other hoe blade being positioned beneath a rearward portion of a base plate. Further, each hoe blade defines a forwardly-directed cutting edge and a reawardly-directed cutting edge which are parallel to one another and which extend transversely of the the base plate. When the tool is moved by the wearer's foot in a fore-and-aft scuffing action, soil loosened by the cutting edges is permitted to pass across the blades through the space defined between each blade and the base plate. The size and disposition of the blades relative to the base plate permit the wearer to comfortably stand or walk while wearing the tool without sinking into the ground. The tool further includes shoe-accepting sections adapted to accommodate any shoe within a range of shoe sizes.

16 Claims, 2 Drawing Sheets

GROUND-WORKING TOOL FOR ATTACHMENT TO THE FOOT OF A WEARER

BACKGROUND OF THE INVENTION

This invention relates generally to ground-working tools and relates, more particularly, to such a tool for attachment to the foot of a wearer so that ground can be worked by appropriate manipulation of the wearer's foot.

Ground-working tools for attachment to a foot of a wearer are known to provide an advantage over a hand-held tools in that the foot-worn tools reduce the likelihood that a user will be required to bend over during use of the tool. Furthermore, feet-worn tools are believed to require a relatively small amount of effort during use in comparison to the amount of effort commonly required by hand-held tools.

It is an object of the present invention to provide a new and improved tool for attachment to the foot or shoe of a wearer for working the ground as the foot is operatively manipulated across the ground.

Another object of the present invention is to provide such a tool for working the ground in an effective manner as the wearer's foot is moved fore-and-aft in a scuffing or shuffling action.

Still another object of the present invention is to provide such a tool enabling the wearer to comfortably stand and/or walk when the tool is operatively attached to the wearer's foot and to reduce the likelihood that the foot of the wearer will sink into the underlying ground.

Yet still another object of the present invention is to provide such a tool which is capable of being attached to any shoe over a relatively large range of shoe sizes.

A further object of the present invention is to provide such a tool which is uncomplicated in construction and effective in operation.

SUMMARY OF THE INVENTION

This invention resides in a ground-working tool for attachment to the foot of a wearer.

The ground-working tool includes a base plate for attachment against the underside of the foot of a wearer, two ground-working hoe blades and support means joining the hoe blades to the base plate. The base plate defines an upper surface adapted to be overlain by the foot when the tool is operatively worn, and the ground-working hoe blades are each arranged generally parallel to and disposed in a spaced relationship with the base plate so as to be positioned on the side of the base plate opposite the upper surface thereof. The support means maintains the hoe blades in the aforedescribed parallel and spaced relationship with the base plate so that the ground beneath the foot of the wearer can be worked with the hoe blades by appropriate manipulation of the tool by the wearer's foot.

BRIEF DESCRIPTION OF THE ILLUSTRATED EMBODIMENT

FIG. 1 is a perspective view of an embodiment of the present invention shown operatively utilized to work ground in a garden or the like.

DETAILED DESCRIPTION OF THE ILLUSTRATED EMBODIMENT

Figure 1:
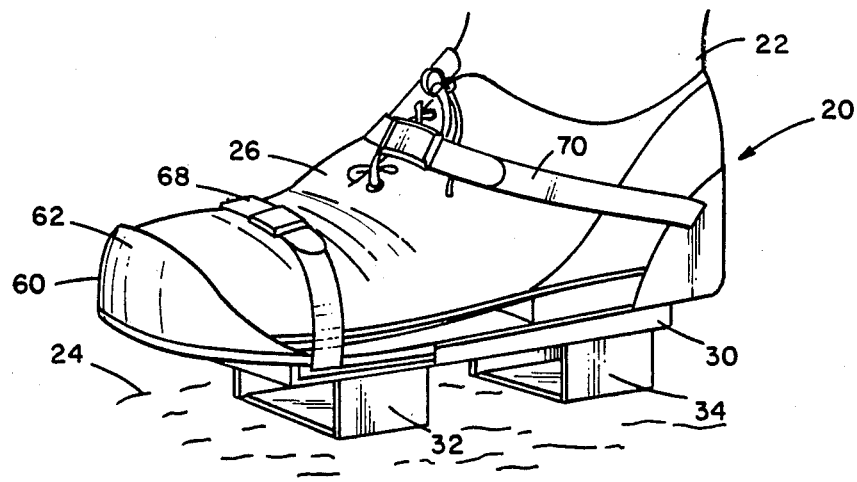

Turning now to the drawings in greater detail and considering first FIG. 1, there is illustrated an embodiment of a ground-working tool, generally indicated 20, in accordance with the present invention and shown operatively worn by the foot of a wearer 22 for working the ground 24 in a garden or field. The tool 20 is shown attached about the wearer's shoe 26 and is adapted to work the ground 24 as the shoe 26 is moved thereacross in a fore-and-aft scuffing action. As is described in greater detail herein, the tool 20 is constructed so that the ground 24 can be worked in an effective manner as the wearer's foot is operatively manipulated and so that the wearer can comfortably stand and walk while the tool 20 is worn.

Although the present invention may be embodied in a pair of tools for wear by both feet of the wearer wherein one tool is adapted for attachment to the wearer's right foot and the other tool is adapted for attachment to the wearer's left foot, the ensuing discussion is directed to a tool 20 adapted for attachment to a left foot. It will be understood, however, that the principles embodied in the tool 20 are capable of being applied to a tool for attachment to the right foot.

Figure 2:
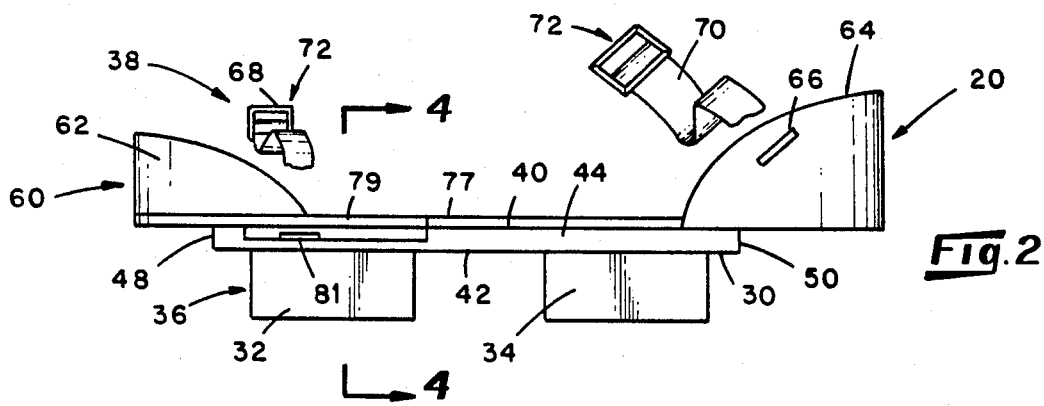
FIG. 2 is a side elevation view of the FIG. 1 embodiment with the straps thereof shown partially cut-away.
Figure 3:
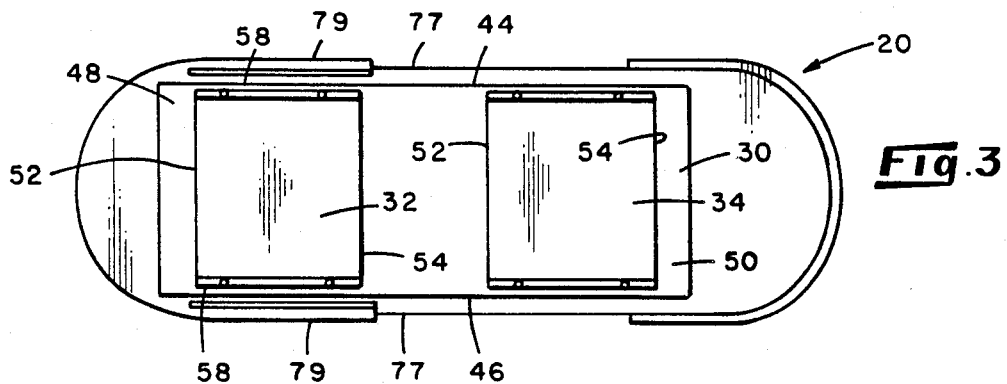
FIG. 3 is a plan view of the FIG. 1 embodiment as seen from below in FIG. 2 wherein the straps thereof are removed.
Figure 4:
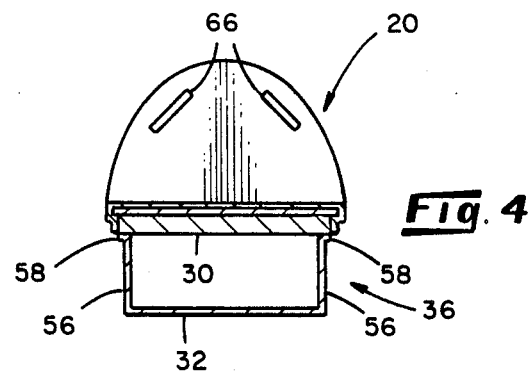
FIG. 4 is a cross-sectional view taken about on lines 4—4 of FIG. 2 wherein the straps thereof are removed.

With reference to FIGS. 2-4, the tool 20 includes means defining a base plate 30 for attachment of the tool 20 to the shoe 26 of the wearer and a pair of hoe blades 32, 34 positioned beneath the base plate 30 as viewed in FIGS. 2 and 4 and support means 36 for rigidly maintaining the blades 32, 34 beneath the base plate 30. The tool 20 further includes means, generally indicated 38, for releasably securing the remainder of the tool 20 about the wearer's shoe.

The base plate 30 of the tool 20 is generally plate-like in shape and defines upper and lower surfaces 40, 42, respectively, and two opposite sides 44 and 46. Furthermore, the base plate 30 includes a forward portion 48 for supporting the forwardmost portion of the shoe 26 and a rearward portion 50 for supporting the heel portion of the shoe 26. It will be understood that when the tool 20 is operatively attached about the shoe, the sole of the shoe 26 overlies the upper surface 40 of the base plate 30. The base plate 30 is constructed of metal but may be constructed of any of a number of suitable materials.

With reference to FIGS. 3 and 4, each hoe blade 32 and 34 is generally thin and flat in shape and disposed generally parallel to and in spaced relationship with the base plate 30. Further, one hoe blade 32 is disposed generally beneath the forward portion 48 of the base plate 30 while the other hoe blade 44 is disposed generally beneath the rearward portion 50 of the base plate 30. Still further and as best shown in FIG. 3, each blade 32 and 34 defines forwardly and rearwardly-directed hoe-type cutting edges 52 and 54, respectively, which are each arranged generally parallel to one another and which extend transversely of the tool 20 and the base plate 30. Moreover, the blades 32 and 34 are arranged in a common plane and are spaced relative to one another.

As best shown in FIG. 4, the support means 36 includes a pair of struts 56 positioned on opposite sides of each hoe blade 32 or 34 for joining the blades 32 and 34 to the base portion 30. In the tool embodiment 20 illustrated, each blade 32 or 34 and associated struts 56 have been integrally formed out of a relatively broad strip of steel bent in such a manner to simulate the shape of a "U" (as viewed in FIG. 4) so that the base of the "U" defines the blade 32 or 34 and the upstanding legs of the "U" define the struts 56. For attachment of these struts 56 to the base plate 30, the struts 56 include flanges 58 at the upper end thereof, and screws are utilized for securing the flanges 58 to the underside of the base plate 30. Alternatively, the support means 36 can be attached to the base plate 30 by means of a weld wherein the bead of the weld extends along the edges of the flanges 58 and adjacent the base plate sides 44 and 46. The struts 56 maintain the blades 32 and 34 in such a relationship along the length of the base plate 30 so that a wearer of the tool 20 can comfortably stand or walk across the ground with little likelihood that the tool 20 will tip the wearer forwardly or rearwardly or that tool 20 will appreciably sink into the underlying ground as the wearer stands upon or walks across the ground.

In accordance with the present invention and with reference again to FIGS. 1 and 2, the tool 20 includes means, generally indicated 60, associated with the base plate 30 for accepting the shoe 26 of the wearer when the shoe 26 is operatively placed thereupon to thereby facilitate the securement of the tool 20 to the shoe 26. To this end, the associated means 60 includes a pair of C-shaped members 62, 64 attached to the forward portion 48 and rearward portion 50, respectively, of the base plate 30 and arranged so that the "C's" thereof open toward one another and so that a shoe positioned therebetween is nestingly received by the space defined therebetween. The C-shaped members 62, 64 can be constructed of plastic or metal and are connected to the base plate 30 in a manner described herein.

Figure 5:
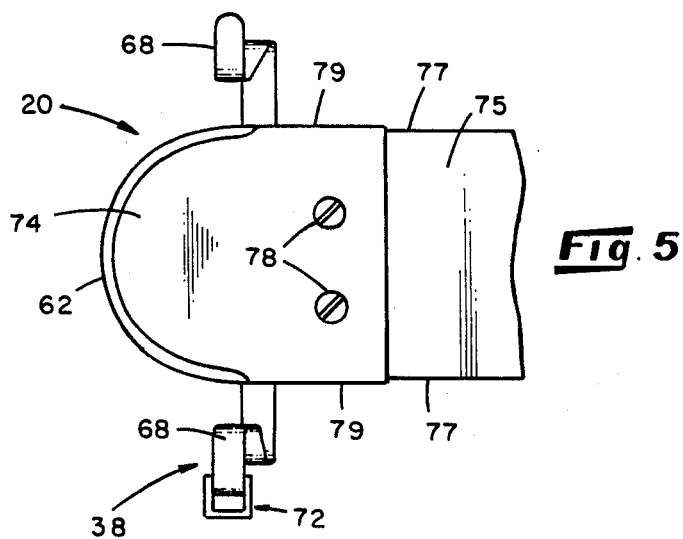
FIG. 5 is a fragmentary plan view of the FIG. 1 embodiment as seen from above in FIG. 2.

With reference to FIGS. 2, 3 and 5, the tool 20 further includes a front plate 74 interposed between the C-shaped member 62 and the base plate 30 and includes a back plate 75 interposed between the C-shaped member 64 and the base plate 30. More specifically, the C-shaped member 64 is fixedly joined, as with rivets, screws, or welds, to the back plate 75 which is, in turn, fixedly attached, as with screws or welds, to the base plate 30. The C-shaped member 62 is fixedly joined to the front plate 74 which is, in turn, mounted upon the back plate 75 for longitudinal movement with respect thereto. To this end, the back plate 75 defines a pair of longitudinally-extending parallel side edges 77 adjacent its forwardmost end, and the front plate 74 defines a pair of opposite downturned side edges 79 which are positioned about and cooperate with the side edges 77 as a guideway and guideway follower to permit longitudinal movement of the front plate 74 relative to the back plate 75 as the side edges 79 are guided along the side edges 77. Hence, by moving the front plate 74 relative to and longitudinally of the back plate 75, the spacing between the C-shaped members 62 and 64 can be adjusted to accommodate the length of any shoe within a relatively broad range of shoe sizes. For purposes of releasably fixing the front plate 74 in position along the length of the base plate 30, there are provided set screws 78 incorporated within the front plate 74 for acting against the upper surface of the back plate 75 and holding the front plate 74 in position along the back plate 75 when the set screws 78 are in a tightened condition.

With reference again to FIGS. 1 and 2, the means 38 for securing the tool 20 about the shoe 26 includes a pair of flexible set of straps 68 and 70 associated with the base plate 30. The strap set 68 is associated with the forward portion 48 of the base plate 30 and, to this end, the front plate 74 includes a depending flange on each side of the tool 20 in which is defined a slot 81 as best shown in FIG. 2. For securement of the strap set 68 of the front plate 74, the straps of the set 68 are looped through the slots 81 located on corresponding sides of the front plate 74. The strap set 70 is associated with the rearward portion 50 of the base plate 30 and, to this end, the C-shaped member 64 defines a pair of slots 66 on opposite sides thereof as best shown in FIGS. 2 and 4. For securement of the strap set 70 to the C-shaped member 64, the straps of the set 70 are looped through the slots 66 located on corresponding sides of the C-shaped member 64. The straps of each strap set 68 or 70 are adapted to be wrapped about the shoe 26 in the manner illustrated in FIG. 1 and each include a buckle arrangement 72 for securement of the corresponding strap set 68 or 70 about the shoe 26 so that when tightly secured thereabout, the hoe blades 32 and 34 are rigidly secured to the wearer's foot for movement therewith.

Figure 6:
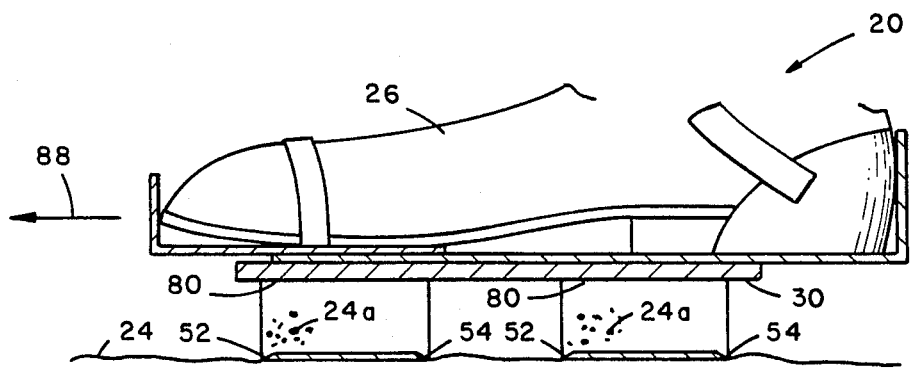
FIG. 6 is a side elevation view, shown partially in section, of the FIG. 1 embodiment illustrating a ground-working operation with the tool.

To utilize the tool 20 once attached to the shoe 26 as afore described and with reference to FIG. 6, the shoe 26 is moved in a fore-and-aft scuffing or shifting action across the ground 24. During a forward shifting of the shoe 26 in the direction of the arrow 88, the forwardly-directed edges 52 of the hoe blades 34, 34 move generally tangentially across the surface of the soil so as to work the ground in what is believed to be a relatively shallow chopping action. Similarly, a rearward shifting of the shoe 26 effects a chopping action of the soil by the rearwardly-directed edges 54 of the blades 32, 34. As the ground is worked with the tool 20 in the afore described fashion, soil, indicated 24a, loosened by the cutting edges 52, 54 is permitted to pass across the blades 32, 34 and through the space, indicated 80 in FIG. 6, defined between the blades 32 and 34 and the underside of the base plate 30 so that the tool 20 can be moved in a scuffing action across the ground with relative ease.

It will be understood that numerous modifications and substitutions can be had to the afore described embodiment without departing from the spirit of the invention. For example, although the straps 68 and 70 of the tool 20 have been shown and described as including a buckle arrangement 72 for securement of the tool 20 upon a shoe 26, other fastener arrangements, such as a hook and loop-type fastener arrangement available under the trade designation Velcro, can be utilized. Accordingly, the afore described embodiment is intended for the purpose of illustration and not as limitation.

What is claimed is:

1. A ground-working tool for wear upon the foot comprising:

a base plate for attachment against the underside of the foot of a wearer and defining an upper surface adapted to be overlain by the foot when said tool is operatively worn, said base plate including a forward portion adapted to be positioned beneath the forwardmost portion of the foot when operatively overlain thereby and a rearward portion adapted to be positioned beneath the heel portion of the foot when operatively overlain thereby;

two ground-working hoe blades each arranged generally parallel to and disposed in a spaced relationship with said base plate so as to be positioned on the side of said plate opposite said upper surface, one of said hoe blades being positioned beneath the forward portion of the base plate and the other of the hoe blades being positioned beneath the rearward portion of the base plate; and support means joining said hoe blades to said base plate for rigidly holding said hoe blades in the aforesaid parallel and spaced relationship with said base plate so that ground beneath the foot of the wearer can be worked with the hoe blades by operative manipulation of said tool by the wearer's foot.

2. The tool as defined in claim 1 further comprising means attached to said base plate for snugly accepting a shoe of a wearer placed therein and thereby facilitating a rigid securement of said base plate to the foot.

3. The tool as defined in claim 1 wherein said one hoe blade is of such size so as to generally span the width of said forward portion of said base plate when measured transversely thereacross and said other hoe blade is of such size so as to generally span the width of said rearward portion of said base plate when measured thereacross.

4. The tool as defined in claim 3 wherein each of said hoe blades defines a first hoe edge directed generally forwardly of the base plate and a second hoe edge directed generally rearwardly of the base plate so that ground can be worked by a fore and aft scuffing action of the wearer's foot.

5. The tool as defined in claim 4 wherein each of said hoe edges are arranged generally transversely of said base plate and generally parallel to one another.

6. The tool as defined in claim 4 wherein each hoe blade has two sides which are each positioned generally beneath a corresponding side of said base plate and said support means includes a pair of struts extending between the base plate and the sides of each hoe blade so that an opening is defined between each hoe blade and the base plate and wherein said opening opens from front-to-back so that fore and aft scuffing of the wearer's foot permits worked ground to pass between each hoe blade and the base plate.

7. The tool as defined in claim 1 wherein each of said hoe blades is relatively broad in comparison to the width of the corresponding base plate portion beneath which the hoe blade is positioned so that the wearer of said tool can easily stand as the hoe blades of said tool lie across the ground.

8. The tool as defined in claim 1 wherein said two hoe blades are arranged in a common plane.

9. The tool as defined in claim 1 further comprising means associated with said base plate for releasably securing the base plate to the foot of the wearer.

10. The tool as defined in claim 9 wherein said means for releasably securing includes a plurality of straps for binding, said base plate to a shoe of the wearer.

11. A ground working tool for wear upon the foot comprising:

a base plate for attachment against the underside of the foot of a wearer and defining an upper surface adapted to be overlain by the foot when said tool is operatively worn;

two ground-working hoe blades each arranged generally parallel to and disposed in a spaced relationship with said base plate so as to be positioned on the side of said plate opposite said upper surface;

support means joining said hoe blades to said base plate for rigidly holding said hoe blades in the aforesaid parallel and spaced relationship with said base plate so that ground beneath the foot of the wearer can be worked with the hoe blades by operative manipulation of said tool by the wearer's foot; and means attached to said base plate for snugly accepting a shoe of a wearer placed therein and thereby facilitating a rigid securement of said base plate to the foot, said means for accepting including a first C-shaped member attached to the base plate adjacent the rear end thereof so that the "C" opens generally forwardly of the base plate for accepting the heel portion of a shoe and a second C-shaped member attached to the base plate adjacent the forward end thereof so that the "C" thereof opens generally rearwardly of the base plate for accepting the toe portion of the shoe.

12. The tool as defined in claim 11 wherein said first and second C-shaped members cooperate with said base plate in a manner permitting an adjustment in spacing between said first and second C-shaped members to thereby accommodate and accept any shoe within a relatively large range of shoe sizes.

13. The tool as defined in claim 12 wherein said first C-shaped member is fixedly secured to said base plate and said second C-shaped member is adapted to be moved longitudinally of and relative to said base plate to accommodate an adjustment in spacing between said first and second C-shaped members as aforesaid.

14. A ground-working tool for securement to a shoe of a wearer including:

means defining a base plate for positioning against the sole of a shoe and including a forward portion adapted to be overlain by the forward portion of the shoe when said tool is operatively worn and a rearward portion adapted to be overlain by the heel portion of the shoe when said tool is operatively worn;

means associated with said base plate for releasably securing said base plate to the shoe;

a first generally flat ground-working hoe blade positioned in spaced and parallel relation with said base plate and disposed generally beneath said forward portion of said base plate when said tool is operatively worn;

a second generally flat ground-working hoe blade positioned in spaced and parallel relation with said base plate and disposed generally beneath said rearward portion of said base plate when said tool is operatively worn, each of said first and second blades defining a pair of hoe edges extending transversely of said base plate and wherein one of said hoe edges is directed forwardly of said base plate and the other of said hoe edges is directed rearwardly of said base plate; and support means joining each of said hoe blades to said base plate for rigidly holding said hoe blades in the aforesaid spaced and parallel relationship with said base plate so that ground beneath the shoe of the wearer can be worked with said hoe blades by manipulation of the shoe in a fore-and-aft scuffing action.

15. The tool as defined in claim 14 wherein said hoe blades are arranged in a common plane and each of said first and second hoe blades is of such size to generally span the width of the corresponding portion of the base plate beneath which the hoe blade underlies to facilitate the standing of the wearer upon the ground with the shoe.

16. The tool as defined in claim 15 wherein said support means support said first and second hoe blades in such a manner that soil worked by said blades is permitted to pass over said blades and beneath said base plate as the shoe is manipulated as aforesaid.

* * * * *